United States Patent [19]
Westwood

[11] Patent Number: 6,106,211
[45] Date of Patent: Aug. 22, 2000

[54] PORTABLE OVERHEAD BIN

[76] Inventor: Ian Westwood, P.O. Box 70012, RPO Bowness, Calgary, Alberta, Canada, T3B 5K3

[21] Appl. No.: 09/333,182

[22] Filed: Jun. 14, 1999

[30] Foreign Application Priority Data

Dec. 1, 1998 [CA] Canada ................................. 2254702

[51] Int. Cl.⁷ ..................................................... B60P 3/00
[52] U.S. Cl. .......................... 414/332; 414/919; 414/21; 222/160; 366/26
[58] Field of Search ........................ 414/21, 332, 919, 414/397, 523, 501, 502, 503, 505; 222/160; 366/26, 62

[56] References Cited

U.S. PATENT DOCUMENTS

| | | | |
|---|---|---|---|
| 3,092,264 | 6/1963 | Milek | 414/332 XV |
| 3,586,181 | 6/1971 | Brock | 414/332 |
| 3,934,739 | 1/1976 | Zumsteg et al. | 414/332 |
| 4,026,441 | 5/1977 | Jones | 414/332 XV |
| 4,248,359 | 2/1981 | Brock | 414/919 XV |
| 4,482,281 | 11/1984 | Musil | 414/332 |
| 4,579,496 | 4/1986 | Gerlach | 414/21 |

FOREIGN PATENT DOCUMENTS

| | | | |
|---|---|---|---|
| 1331921 | 6/1963 | France | 414/332 |
| 816595 | 10/1951 | Germany | 414/919 |

*Primary Examiner*—Frank E. Werner
*Attorney, Agent, or Firm*—Adams, Schwartz & Evans, P.A.

[57] ABSTRACT

A portable overhead bin comprising a plurality of adjacent frame members pivotally connected such that the frame members form a horizontal transport frame when in the lowered transport position, and further form an elevated overhead frame when the frame members are moved to a raised operating position. A bin is supported by the frame members. A hitch is attached at the front end of the transport frame for attachment to a towing vehicle and wheels are adapted to support the transport frame for movement by the towing vehicle. A transport vehicle may be positioned between two of the frame members and under the bin to receive the contents thereof through a bottom discharge. A force, either external to the invention or included therein, is applied to at least one frame member to raise the bin into the overhead operating position. A conveyor may be provided to convey material into the raised bin.

15 Claims, 7 Drawing Sheets

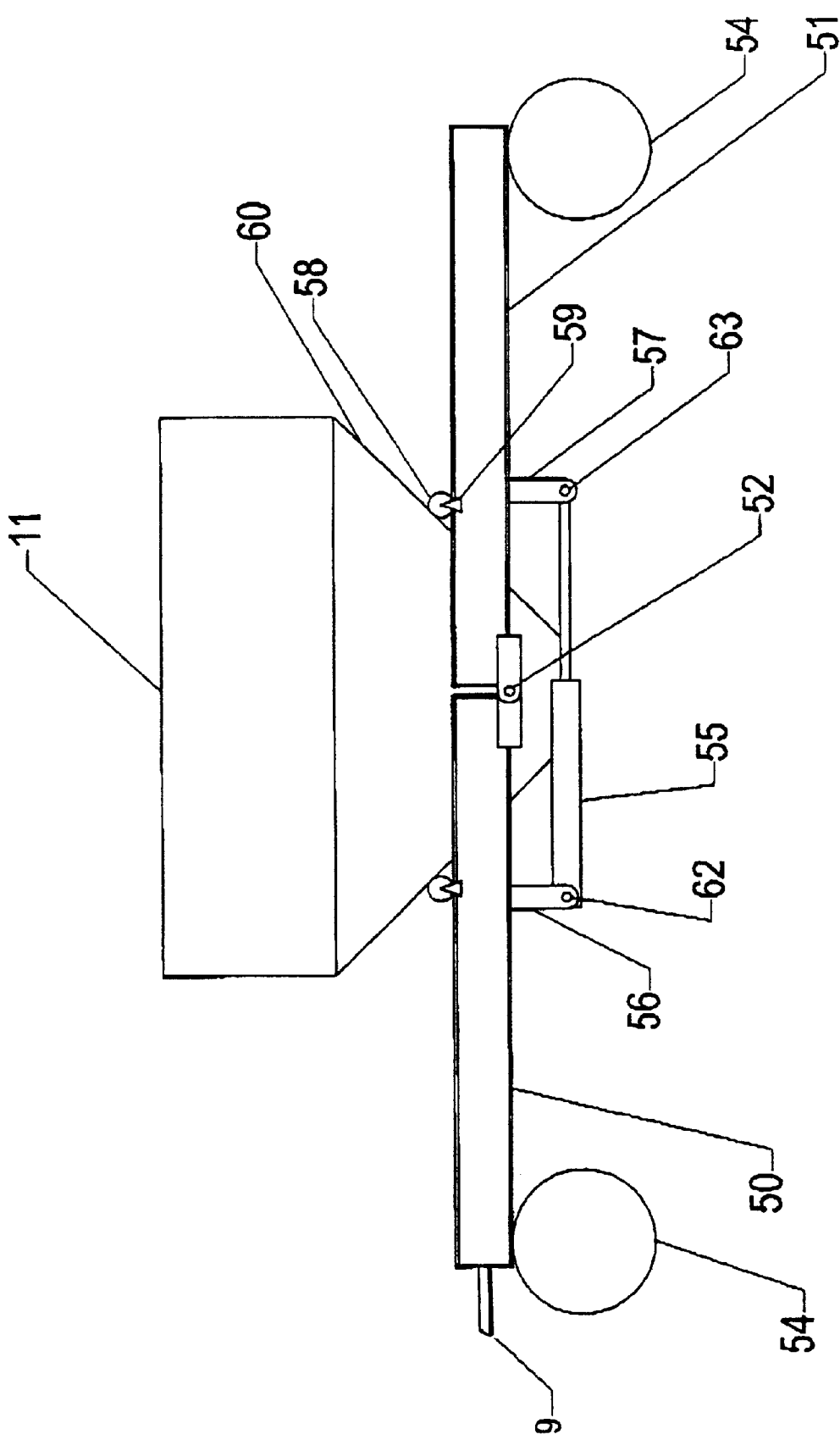

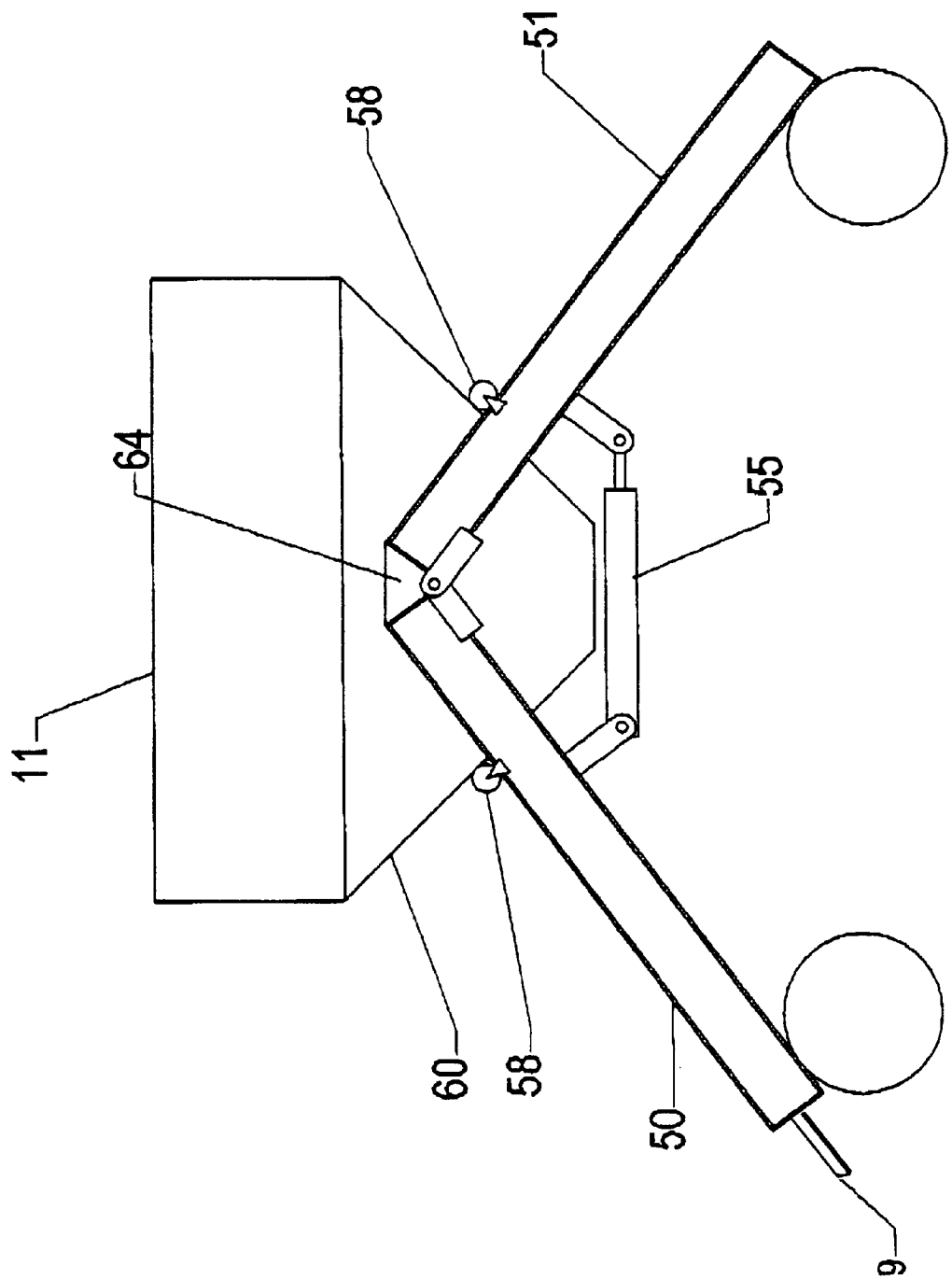

ID BIN

This invention deals with the field of devices for storing and dispensing bulk materials and in particular a portable device for storing such material in an overhead position for loading by gravity into transport vehicles.

BACKGROUND

Overhead bins are common in the asphalt industry for use as surge bins for receiving the continuous production of asphalt from a portable asphalt plant and holding the same until a truck arrives to take the asphalt away by driving under the bin and loading by gravity. Such bins are well known in the art as disclosed, for example, in U.S. Pat. Nos. 4,482,281 to Musil, 4,465,420 to Dillman, 4,348,146 to Brock and 4,337,014 to Farnham.

These prior art devices comprise a rigid trailer frame, with the bin mounted thereon. In the case of the '014 device of Farnham, the bin and its supporting legs form the rigid trailer frame, essentially having a hitch on one end and wheels on the opposite end.

The bins of Dillman and Farnham are raised to the overhead operating position by pivoting them from a horizontal transport orientation to a vertical operating orientation. In the Brock device, the bin is transported in the operating orientation, and the legs are pivoted from a horizontal to a vertical position to raise the bin to the overhead operating position. The Dillman and Brock devices require the asphalt transporting truck to pass over the lowered trailer frame in order to load from the bin, thus requiring ramps.

The Musil device consists of a rigid frame that is formed to allow the loading trucks to pass under it. During transport the bin is lowered into the frame, occupying the space through which the loading trucks will pass. For operation, jacks are extended down from the frame to support the device on the ground, and the bin is vertically raised by winches and pulleys to a position above the frame.

The above devices also disclose a conveyor for elevating the asphalt from the plant into the bin. This conveyor may be carried on the trailer with the bin, as in the Brock and Musil devices, or on a separate trailer as in the Dillman and Farnham devices.

The above prior art devices are self-erecting, however other such devices are used which are erected with a crane or other external means.

The majority of the prior art in the field has been in the asphalt industry, as discussed above, however such an overhead bin would be valuable in many other situations. Where an operation, such as harvesting grain or other crops, results in a steady stream of product that is removed by trucks or wagons, such an overhead bin would be an asset. Where any bulk material must be stored temporarily, an overhead bin of this type could be beneficial.

The prior art devices are complex, expensive and require time to set up and take down. It is desirable to minimize the time required to convert such a device from the transport mode to the operational mode and back again, as set-up time is down-time, and does not generate income for the operator.

During operation the rigid trailer frame is not utilized in most cases and indeed is in the way, requiring ramps as discussed above. Designing the rigid trailer frame to accommodate the passage of trucks thereunder requires very strong frame members and leads to the need for a complex system of winches to raise the bin to the top of the frame.

An articulating trailer frame, wherein the horizontal frame members of the trailer may be pivoted with respect to each other and act to raise the bin and further act as the legs required to support the bin in the overhead position, would reduce the material required, the weight, the expense and the complexity of the device.

SUMMARY OF THE INVENTION

It is an object of the present invention to provide a portable overhead bin that utilizes a multiple member horizontal frame for transport, wherein the members pivot with respect to each other to raise the bin to the overhead operating position and also form the legs required to support the bin in that position, thereby reducing cost and complexity of the device.

It is a further object of the present invention to provide such a bin that is requires less time to convert from the transport to the operating mode, and vice versa, than present devices.

It is a further object of the present invention to provide such a portable overhead bin that is self-erecting.

It is a further object of the present invention to provide such device that includes a conveyor operable to convey bulk material into the bin.

The invention accomplishes these objects providing a portable overhead bin comprising a plurality of adjacent frame members, each having a front end and a rear end, the rear end of one said frame member pivotally connected to the front end of the next frame member, said pivotal connection such that said frame members form a horizontal transport frame when in the lowered transport position, and further form an elevated overhead frame when said frame members are moved to a raised operating position; a hitch attached at the front end of said transport frame for attachment of said transport frame to a towing vehicle; wheels adapted to support said transport frame for movement by said towing vehicle; a bin, having a bottom discharge door, said bin supported by said frame members such that when said frame members are in their lowered transport position said bin is supported in a lowered transport position, and further such that when said frame members are in their raised operating position, said bin is supported in an overhead operating position whereby a transport vehicle may be positioned between two of said frame members and under said bin to receive the contents thereof through said bottom discharge door; and means to secure said frame members into said raised operating position, where in operation a force is applied to at least one said frame member to raise said bin into said overhead operating position.

Thus the frame members that make up the transport necessary to move the bin are utilized to support the bin in its overhead operating position, thereby reducing the amount of material needed. The frame members are substantially horizontal in end to end alignment when in the lowered transport position. A crane or similar lifting device, as is used for erecting some prior art devices, can be used to raise the bin and allow the frame members to pivot downwards relative to the bin and be locked into the raised operating position.

The number of frame members could be two, and a plurality of rollers attached to the frame members could support the bin, allowing the frame members to pivot while still supporting the bin. The two frame members would act as slanted legs to support the bin, with the pivot joint between them raised in the air. The legs could be secured in the raised operating position by a rigid bar attached between them. Other support means besides rollers can be used, and one skilled in the art could use any known methods for accomplishing the purpose of supporting the bin as the frame members pivot.

For a self-erecting bin, means could be incorporated to provide a force between the frame members such that they pivot into the operating position.

Alternatively the plurality of frame members could comprise a front frame member, the rear end thereof pivotally connected to the front end of a middle frame member, the rear end of the middle frame member pivotally connected to the front end of a rear frame member and the bin could be supported on the middle frame member.

In order to provide positive relative movement between the frame members a first rigid pivot link could be pivotally connected to the front frame member and pivotally connected to the rear frame member, whereby movement of one of the front and rear members moves the other of the members. Adjustment of the pivot points and the arc traveled by each end of the rigid pivot link would adjust the relative movements of the frame members.

This embodiment could be raised with a crane as above. For a self erecting bin, means could be incorporated to apply a force between two of the frame members such that the front, middle and rear frame members pivot to form the operating frame wherein the front end of the front frame member and the rear end of the rear frame member rest on the ground, and wherein the bin is supported in the overhead operating position by the middle frame member, and wherein the transport vehicle is positioned between the front and rear frame members to receive the contents of the bin. With the rigid pivot link in place, a force between any two of the front, middle or rear frame members will cause the other to move in the proper relationship. The means to apply a force between two of the frame members could be a hydraulic actuator.

The front frame member could comprise two elongated side members separated by a sufficient width to accommodate a towing vehicle between same with the hitch pivotally attached, about a horizontal axis perpendicular to the direction of travel, to the front frame member between the side members; and a second rigid pivot link pivotally connected to the hitch and pivotally connected to the middle frame member. The hydraulic actuator could be attached at one end to the hitch and at the opposite end to the middle frame member. This arrangement can be configured so that the middle frame member and the hitch remain substantially parallel as the hydraulic actuator extends and as the front and rear frame members pivot upwards, carrying the bin into the overhead operating position as will be described in the detailed description of the invention.

It will be seen by those skilled in the art that the hydraulic actuator could act between various of the frame members, and achieve the same result. The linkages will maintain the desired relationship, and all that is required is a force acting between members to cause a movement which will be transferred to the other members.

Alternatively, a plurality of hydraulic actuators could be employed acting between various of the frame members to achieve the same end result. It is only necessary that the lowered transport position and raised operating position be achieved in some manner, and the intermediate positions are not critical.

The means to secure the front, middle and rear frame members into the raised operating position could be a first plate attached between the front and middle frame members and a second plate attached between the middle and rear frame members.

The bin described to this point may be loaded by any conventional conveyor suitable for the material being handled, for example a drag conveyor for asphalt or aggregate, or an auger conveyor for grain. The conveyor could be lifted into the operating position by any conventional method. Alternatively a conveyor could be incorporated into the portable overhead bin apparatus so that it is carried on the apparatus, and is placed in its operating position by the same movements of the frame members that place the bin in its proper overhead operating position.

The apparatus could further comprise a conveyor having a top discharge end and a bottom receiving end, the conveyor supported longitudinally on the rear frame member such that the top discharge end is towards the front end of the transport frame and the bottom receiving end extends rearward of the rear frame member, the conveyor extending over the bin. The conveyor could be supported on the rear frame member, in a position substantially parallel to the rear frame member, by pivotal attachment to a front conveyor support fixed to the rear frame member, and by a saddle rest on top of a rear conveyor support fixed to the rear frame member rearward of the front conveyor support, such that when the frame members are in the lowered transport position the conveyor is received in a recess in the rear end of the bin, and when the frame members are in the raised operating position, the top discharge end thereof is positioned over the bin and the bottom receiving end is near or on the ground.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 6 is a side view of an simple alternate embodiment in a lowered transport position.

FIG. 7 is a side view of the embodiment of FIG. 6 in a raised operating position.

DETAILED DESCRIPTION OF THE ILLUSTRATED EMBODIMENTS

Figure 1:
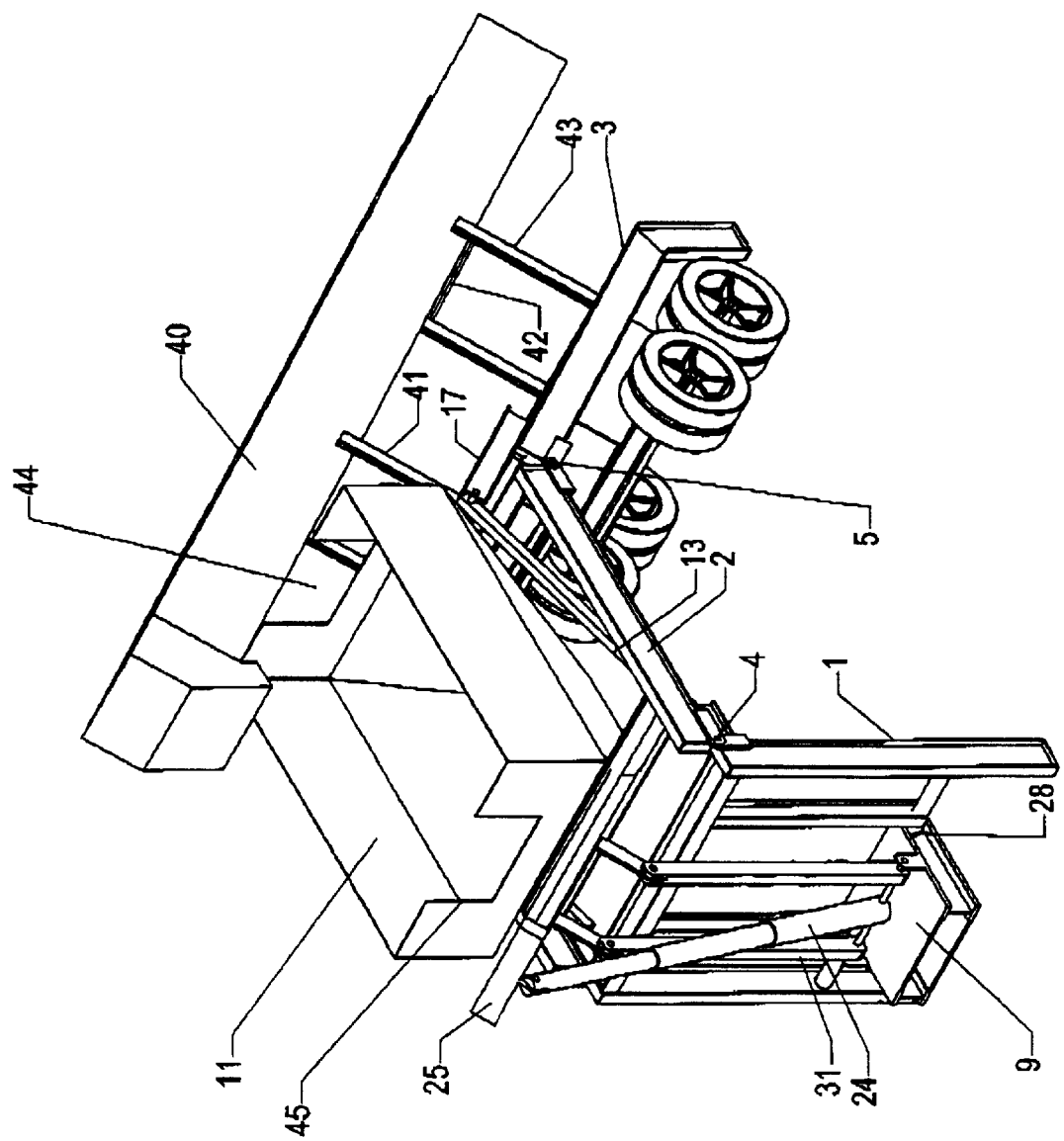
FIG. 1 is a perspective view of the embodiment.
Figure 5:
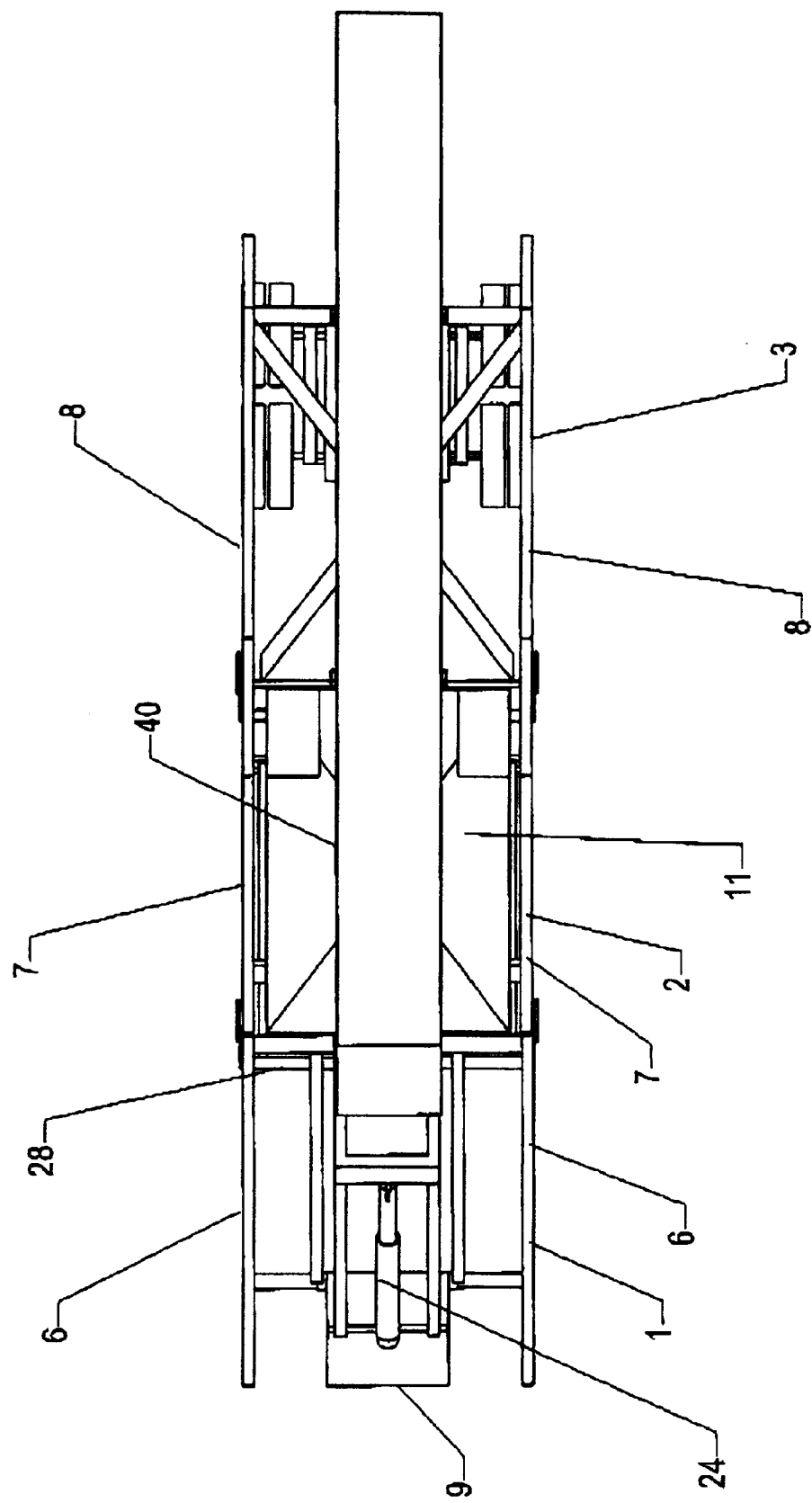
FIG. 5 is a top view of the embodiment of FIG. 1 in a lowered transport position.

FIG. 1 shows one preferred embodiment of the invention. A portable overhead bin comprises an articulated frame made up of three adjacent frame members: a front frame member 1, a middle frame member 2, and a rear frame member 3. Each frame member has a front end, 1a, 2a, 3a and a rear end 1b, 2b, 3b. The rear end 1b of the front frame member 1 is pivotally connected at front hinge point 4 to the front end 2a of the middle frame member 2. Similarly the rear end 2b of the middle frame member 2 is pivotally connected at rear hinge point 5 to the front end 3a of the rear frame member 3. As illustrated in the top view of FIG. 5, each of the frame members 1, 2, 3 are made up of side-rails 6, 7 and 8 on each side of the device, connected by various cross supports.

Figure 2:
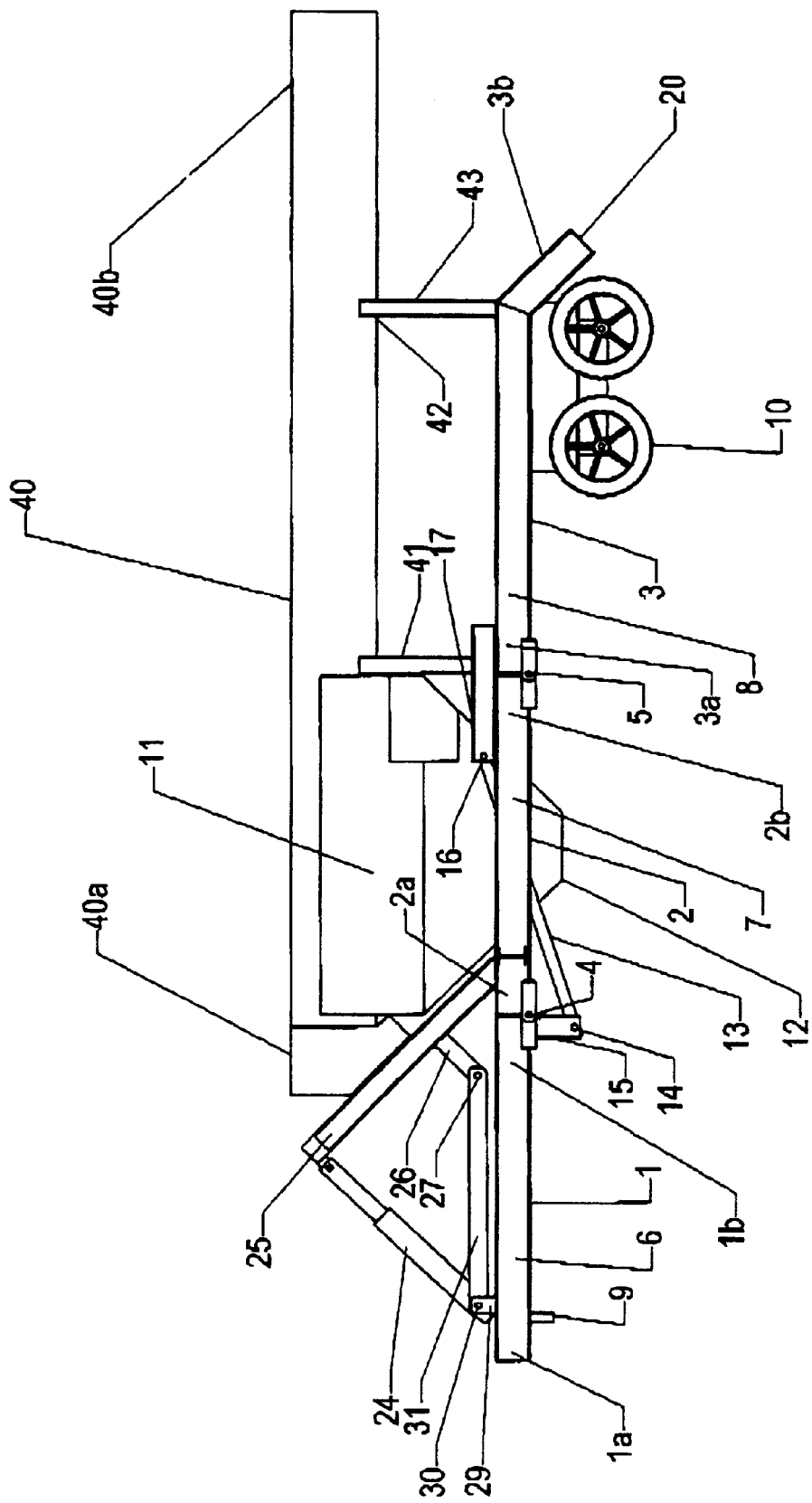
FIG. 2 is a side view of the embodiment of FIG. 1 in a lowered transport position.

As can be more easily seen in FIG. 2, the hinge points 4 and 5 are located at the bottom of the side-rails 6, 7 and 8 on the frame members 1, 2, 3 and located so that the end faces of the side-rails 6, 7, 8 bear against each other when the articulated frame is in the lowered transport position as illustrated in FIG. 2. In the lowered transport position the frame members 1, 2, 3 form a horizontal transport frame with a hitch 9 attached at the front end thereof for attachment of the transport frame to a towing vehicle (not shown) and wheels 10 mounted to the rear frame member 3 to support the transport frame for movement by the towing vehicle.

The articulating frame supports a bin 11 having a bottom discharge door 12. When the frame members 1, 2, 3 are in their lowered transport position the bin is supported in a lowered transport position, as illustrated in FIG. 2. The bin 11 is fixedly attached to the middle frame member 2.

Figure 4:
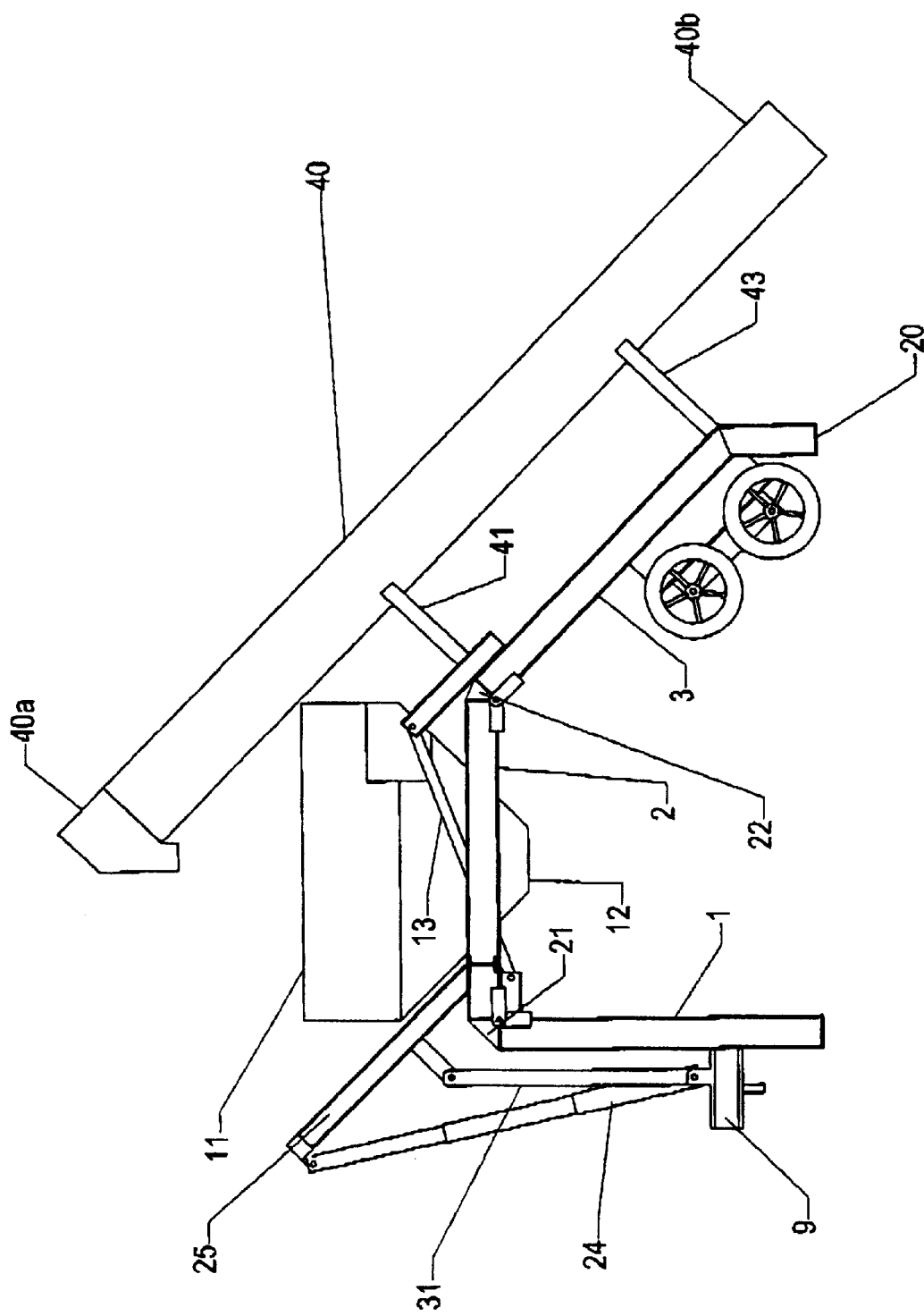
FIG. 4 is a side view of the embodiment of FIG. 1 in a raised operating position.

FIG. 4 illustrates the articulating frame in the raised operating position forming an elevated overhead frame. The bin 11 is supported in the overhead operating position on middle frame member 2 whereby a transport vehicle may be positioned between the front and rear frame members 1, 3 and under the bin 11 to receive the contents thereof through the bottom discharge door 12. The rear end 3b of the rear frame member 3 is bent down at a 45 degree angle so that the configuration of FIG. 4 may be achieved, with the rear face 20 of the rear frame member 3 squarely on the ground and the wheels 10 raised off the ground for stability. The majority of the rear frame member 3 is at a 45 degree angle, which orientation removes the wheels 10 from the path of a transport vehicle under the raised bin 11. As can be seen, when in the raised operating position all parts of the articulating frame are out of the way, and the transport vehicle is not required to drive over the frame, but may remain on the ground.

The frame members 1, 2, 3 are secured in the raised operating position by front plate 21 bolted to the end faces of the front and middle frame members 1, 2 and by rear plate 22 bolted to the end faces of the middle and rear frame members 2, 3. A rigid brace could be attached between frame members or any other conventional means could be used to secure the frame members A rigid frame pivot link 13 is pivotally connected by a conventional pin and hole at one end to a front link pivot point 14 fixed to a front link arm 15 which arm is fixed to the front frame member 1 and at the opposite end to a rear link pivot point 16 fixed to a rear link arm 17 which arm is fixed to the rear frame member 3. Thus pivotal movement of the front frame member 1 about front link pivot point 14 forces the frame pivot link 13 to cause pivotal movement of the rear frame member 3 about rear link pivot point 16. The link arms 15, 17 and pivot points 14, 16 are arranged such that the lowered transport position of FIG. 2 and the raised operating position of FIG. 4 are achieved. It can be seen that applying a force between any two of the frame members 1, 2, 3 will cause the articulating frame to move between those two positions. Alternatively, as in some prior art devices, a crane could simply be attached to the middle frame member 2. Lifting on this middle frame member 2 will allow the front and rear frame members 1, 3 to drop into the raised operating position where plates 21, 22 can be fixed into place to secure the articulating frame.

The illustrated preferred embodiment includes a means to exert the force required to raise the articulating frame into the raised operating position. The means also serves to keep the hitch 9 substantially horizontal as the bin 11 and frame are being raised, thereby allowing the towing vehicle to remain attached to the device during raising so as to maintain control.

The force exerting means is a hydraulic cylinder 24. Cylinder bracket 25 is fixed to the front end 2a of the middle frame member 2 and extends up and forward as illustrated. A top hitch link arm 26 is fixed to the cylinder bracket 25, and top hitch link pivot point 27, being a conventional pin and hole, is located thereon. Hitch 9 is a pivotally attached between front frame member side rails 6 on hitch pivot pipe 28. The side-rails 6 are spaced far enough apart so that a towing vehicle fits between the side-rails 6. A bottom hitch link arm 29 is fixed to the hitch 9, and bottom hitch link pivot point 30, being a conventional pin and hole, is located thereon. A rigid hitch pivot link 31 is pivotally attached at the top end thereof to the top hitch link pivot point 27 and at the bottom end thereof to the bottom hitch link pivot point 30. The top end of the hydraulic cylinder 24 is pivotally attached to a top cylinder pivot point on the end of the cylinder bracket 25. The bottom end of the hydraulic cylinder 24 is pivotally attached to the hitch 9. As illustrated the pivot point of the cylinder 24 on the hitch coincides with the bottom hitch link pivot point 30. This is for convenience only, and the pivot points do not need to coincide.

Figure 3:
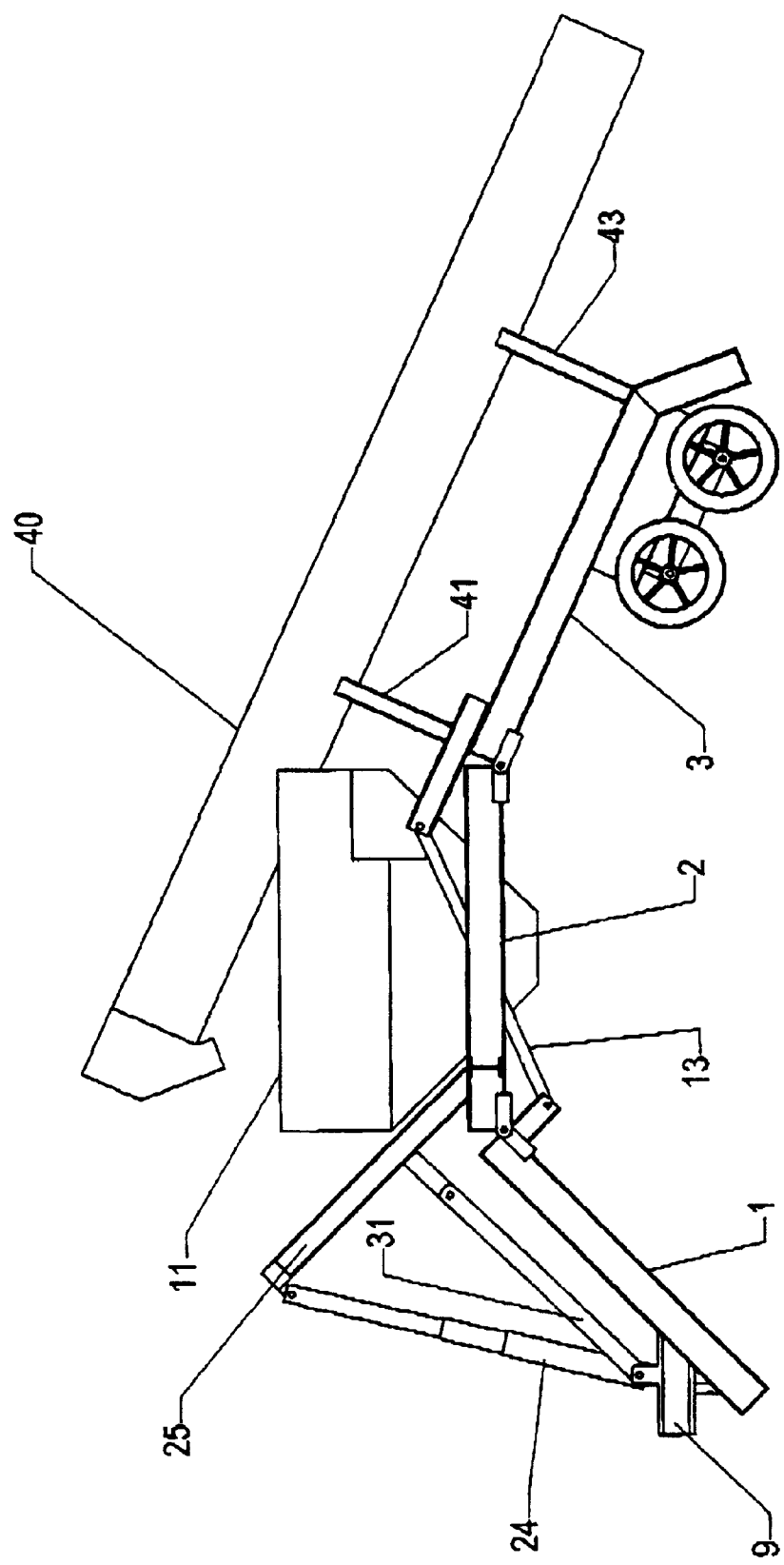
FIG. 3 is a side view of the embodiment of FIG. 1 in a partially raised intermediate position.

FIGS. 2, 3 and 4 illustrate the operation of the device as it moves from the lowered transport position of FIG. 2 to the raised operating position of FIG. 4. In FIG. 2 the hydraulic cylinder 24 is in the retracted position. FIG. 3 shows the hydraulic cylinder 24 partially extended. The hitch 9 is held in the substantially horizontal position illustrated by its attachment to the towing vehicle (not shown). The towing vehicle rolls backwards as the hydraulic cylinder 24 is extended and also keeps the front end 1a of the front frame member 1 off the ground. If the towing vehicle is removed and replaced by a jack or stand, or simply lowered to the ground, extending the hydraulic cylinder 24 will still cause the articulating frame to achieve the raised operating position of FIG. 4, however the hitch and front end 1a of the front frame member 1 will drag along the ground and cause ruts and so forth.

The hydraulic cylinder 24 exerts a force pushing apart the middle frame member 2, through the cylinder bracket 25, and the front frame member 1, through the hitch 9 and hitch pivot point 28, causing the front and middle frame members 1, 2 to pivot with respect to each other about front hinge point 4. This pivotal movement of front frame member 1 in turn pushes rigid frame pivot link 13 against the rear frame member 3 and causes it to pivot about rear hinge point 5. When the hydraulic cylinder 24 is fully extended, the raised operating position of FIG. 4 is achieved, and front and rear plates 21, 22 are bolted into place to secure the articulating frame in position. In the preferred embodiment, the holes at the front link pivot point 14 are slightly slotted to facilitate installation of the plates 21, 22. The towing vehicle can now be removed and the front end 1a of the front frame member 4 rests on the ground.

To move into the lowered transport position, the towing vehicle is attached to the hitch, the plates 21, 22 are removed, and the hydraulic cylinder 24 is retracted.

The preferred embodiment illustrated also comprises a conveyor 40 having a top discharge end 40a and a bottom receiving end 40b. The conveyor is supported longitudinally on the rear frame member 3 such that the top discharge end 40a is towards the front end of the transport frame and the bottom receiving end 40b extends rearward of the rear frame member 3. The conveyor 40 extends over the bin 11. The conveyor 40 is supported on the rear frame member 3, in a position substantially parallel to the rear frame member 3, by pivotal attachment to a front conveyor support 41 fixed to the rear frame member 3, and by a saddle rest 42 on top of a rear conveyor support 43 fixed to the rear frame member rearward of the front conveyor support 41. The pivot and saddle allow the discharge end 40b to lift up if it contacts the ground or another object as the bin11 is being raised, thus preventing damage when used on uneven terrain or the like.

As illustrated in FIG. 2, when the frame members 1, 2, 3 are in the lowered transport position the conveyor 40 is received in a recess 44 in the rear end of the bin 11. In the embodiment illustrated there is as well a recess 45 in the front of the bin 11, which might not be necessary with another slightly altered configuration. These recesses 44, 45 could be filled with a filler plate or the like if desired.

As illustrated in FIG. 4, when the frame members 1, 2, 3 are in the raised operating position, the top discharge end 40a is positioned over the bin 11, such that the material carried by the conveyor will fall into the bin 11, and the bottom receiving end 40b is near or on the ground, so that material may be fed into the conveyor 40. The top discharge end 40a may include a slug-feeder for discharging aggregate or asphalt.

FIGS. 6 and 7 illustrate a very simple embodiment of the invention wherein the articulating frame comprises only a front frame member 50 and a rear frame member 51 pivotally attached at middle hinge 52. The pivotal attachment is similar to that of the earlier illustrated preferred embodiment. In the lowered transport position of FIG. 6, the frame members 50, 51 form a horizontal transport frame supported by wheels 54 at each end thereof. A conventional hitch (9) and steering mechanism could be incorporated. Having wheels 54 at each end allows the device to be moved when in the raised operating position of FIG. 7. The wheels 54 may be blocked when desired to maintain the proper position. Other hitch and wheel configurations could be used to support the two piece articulating frame for the particular circumstances of use.

A hydraulic cylinder 55 is pivotally attached by conventional pin and hole pivot connections 62, 63 at one end to the front frame member 50 by front bracket 56 fixed thereto and at the opposite end to the rear frame member 51 by rear bracket 57 fixed thereto. The hydraulic cylinder 55 is fully extended in the lowered transport position of FIG. 6 and fully retracted in the raised operating position of FIG. 7. Alternatively, as discussed above, a crane could be used to raise the device into the raised operating position.

Bin 11 is supported on rollers 58 rotatably attached by roller brackets and bearings 59 to the front and rear frame members 50, 51. As the front and rear frame members 50, 51 pivot, the rollers 58 rotate against the sloped hopper walls 60, allowing the bin to rise or fall while being supported in a suitable position.

The frame members 50, 51 are secured in the raised operating position by a plate 64 bolted to the end faces of the front and rear frame members 50, 51. A rigid brace could be attached to each frame member or any other conventional means could be used to secure the frame members 50, 51. Similarly the bin 11 may be secured in the raised operating or lowered operating position.

As is clear from the figures, there are actually a pair of each of the above links, pivot points and so forth, one on each side of the apparatus. For clarity, the above description most often does not refer to this fact, but it is to be understood that such is the case.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A portable overhead bin for towing along the ground and erecting on the ground comprising:

a plurality of adjacent frame members, each having a front end and a rear end, the rear end of one said frame member pivotally connected to the front end of the next frame member, said pivotal connection such that said frame members form a horizontal transport frame having corresponding front and rear ends when in a lowered transport position, and further form an elevated overhead frame when said frame members are moved to a raised operating position with the rear end of a rear frame member adjacent to the ground and the front end of a front frame member adjacent to the ground, and all other portions of said plurality of frame members raised above the ground such that a transport vehicle may pass on the ground between said front and rear frame members;

a hitch attached near the front end of said front frame member for attachment of said transport frame to a towing vehicle;

wheels attached at least to a frame member other than said front frame member and adapted to support said transport frame for movement by said towing vehicle;

a bin, having a front end, a rear end, two sides and a bottom discharge door, said bin supported by at least one of said frame members such that when said frame members are in said lowered transport position, and further such that when said frame members are in said raised operating position, said bin is supported in an overhead operating position wherein a transport vehicle may be positioned on the ground between said front and rear frame members and under said bin to receive the contents thereof through said bottom discharge door; and means to secure said frame members into said raised operating position by preventing the movement of any frame member relative any other frame member, where in operation a raising force is applied to at least one said frame member to raise said bin into said overhead operating position.

2. The portable overhead bin of claim 1, wherein said wheels are attached to said rear frame member.

3. The portable overhead bin of claim 1, wherein the number of frame members is two.

4. The portable overhead bin of claim 3, wherein said bin further comprises a hopper bottom with front and rear slanted panels and wherein said bin is supported by said front slanted panel resting on a first roller rotatably attached laterally across a first frame member and by said rear slanted panel resting on a second roller rotatably attached laterally across a second adjacent frame member.

5. The portable overhead bin of claim 3, further comprising means to apply said raising force to said one member by exerting a force between said frame members such that said frame members pivot into said raised operating position.

6. The portable overhead bin of claim 5, wherein a hydraulic actuator exerts said force between said frame members and wherein said hydraulic actuator is pivotally attached at one end thereof to one of said two frame members and at the opposite end thereof to the other of said two frame members.

7. The portable overhead bin of claim 1, wherein said plurality of frame members comprises front, middle and rear frame members, the rear end of said front frame member pivotally connected to the front end of said middle frame member and the rear end of said meddle frame member pivotally connected to the front end of said rear frame member and wherein said bin is supported on said middle frame member.

8. The portable overhead bin of claim 7, further comprising a first rigid pivot link pivotally connected to said front frame member and pivotally connected to said rear frame member, whereby movement of one of said front and rear members moves the other of said members.

9. The portable overhead bin of claim 7, further comprising means to apply said raising force to said one member by exerting a force between two of said frame members such that said front, middle and rear frame members pivot to form said elevated operating frame, and wherein said bin is supported in said overhead operating position by said middle frame member.

10. The portable overhead bin of claim 9 wherein said force between two of said frame members is exerted by a hydraulic actuator pivotally attached at one end thereof to one of said two frame members and at the opposite end thereof to the other of said two frame members.

11. The portable overhead bin of claim 10, wherein:

said front frame member comprises two elongated side members separated by a sufficient width to accommodate a towing vehicle between same;

said hitch is pivotally attached about a horizontal axis to said front frame member between said side members and substantially perpendicular to said side members;

a second rigid pivot link is pivotally connected to said hitch and pivotally connected to said middle frame member; and said hydraulic actuator is attached at one end to said hitch and at the opposite end to said middle frame member.

12. The portable bin of claim 11, wherein said means to secure said front, middle and rear frame members into said raised operating position are a first plate attached between said front and middle frame members and a second plate attached between said middle and rear frame members.

13. The portable overhead bin of claim 7, further comprising a conveyor having a top discharge end and a bottom receiving end, said conveyor supported longitudinally on said rear frame member such that said top discharge end is towards the front end of said transport frame and said bottom receiving end extends rearward of said rear frame member, said conveyor extending over said bin.

14. The portable overhead bin of claim 13, wherein:

said conveyor is supported on said rear frame member, in a position substantially parallel to said rear frame member, by pivotal attachment to a front conveyor support fixed to said rear frame member, and by a saddle rest on top of a rear conveyor support fixed to said rear frame member rearward of said front conveyor support; and when said frame members are in said lowered transport position said conveyor is received in a recess in the rear end of said bin, and when said frame members are in said raised operating position, said top discharge end thereof is positioned over said bin and said bottom receiving end is near or on the ground.

15. The portable overhead bin of claim 14, further comprising means to apply said raising force to said one member by exerting a force between two of said frame members such that said front, middle and rear frame members pivot to form said operating frame and wherein said bin is supported in said overhead operating position by said middle frame member.

* * * * *

UNITED STATES PATENT AND TRADEMARK OFFICE
CERTIFICATE OF CORRECTION

PATENT NO. : 6,106,211
DATED : August 22, 2000
INVENTOR(S) : Ian Westwood

It is certified that error appears in the above-identified patent and that said Letters Patent is hereby corrected as shown below:

Column 9, claim 7,
Line 11, the word "meddle" should be deleted and insert the word -- middle --.

Signed and Sealed this

Twenty-fifth Day of December, 2001

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO. : 6,106,211
DATED : August 22, 2000
INVENTOR(S) : Ian Westwood

It is certified that error appears in the above-identified patent and that said Letters Patent is hereby corrected as shown below:

<u>Column 9,</u>
Line 11, the word "meddle" should be deleted and insert the word -- middle --.

Signed and Sealed this

Twentieth Day of August, 2002

Attest:

JAMES E. ROGAN
Attesting Officer    Director of the United States Patent and Trademark Office